Aug. 15, 1961     I. D. GLAZER     2,996,329
BOTTLE CARRIER

Filed May 19, 1955     2 Sheets-Sheet 1

INVENTOR
Irving D. Glazer

BY Ashley & Ashley

ATTORNEYS

INVENTOR
Irving D. Glazer

BY

ATTORNEYS

United States Patent Office 2,996,329
Patented Aug. 15, 1961

2,996,329
BOTTLE CARRIER
Irving D. Glazer, Dallas, Tex., assignor to Dura Pak Corporation, Kansas City, Mo., a corporation of Delaware
Filed May 19, 1955, Ser. No. 509,595
23 Claims. (Cl. 294—87.2)

This invention relates to new and useful improvements in bottle carriers.

One object of the invention is to provide an improved bottle carrier of the head or top supporting type which is of economical, durable construction capable of being automatically or manually loaded and unloaded.

An important object of the invention is to provide an improved bottle carrier having a plate-like body of elastic or resilient material with openings in its margins for supporting bottles by their head or neck portions, the openings being so arranged that the bottles may be inserted and removed by longitudinal or swinging movement of said bottles.

A particular object of the invention is to provide an improved bottle carrier having a substantially flat body with sockets at its margins for gripping and supporting the bottles by their head or neck portions and arranged to permit automatic loading and unloading of the carrier by relative longitudinal movement between the body and bottles, the sockets having outwardly-disposed jaws of elastic or resilient material for permitting relative swinging movement of the bottles to facilitate manual loading and unloading of the carrier.

Another object of the invention is to provide an improved bottle carrier, of the character described, which may be economically constructed of polyethylene, other suitable plastic, rubber or other material having sufficient rigidity to support bottles and elasticity or resiliency to permit insertion and removal of the bottles by hand or machine and which is of rugged construction so as to be many times more durable than paperboard carriers.

A further object of the invention is to provide an improved bottle carrier, of the character described, wherein the sockets and their jaws may vary in accordance with the contour of the head or neck portions of the bottles, may have ribs and/or shoulders for reinforcement or for frictional or supporting engagement with said bottle heads or necks, may have enlarged lower portions to facilitate insertion of capped bottles by relative upward movement, and may be connected to one another by reinforcing ribs whereby the body of the carrier may be of relatively-thin, inexpensive construction.

A construction designed to carry out the invention will be hereinafter described, together with other features of the invention.

Figure 1:
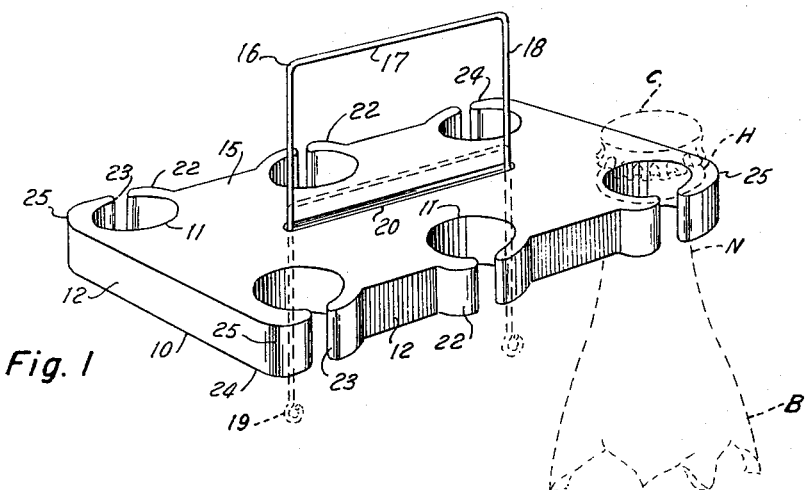
Figure 2:
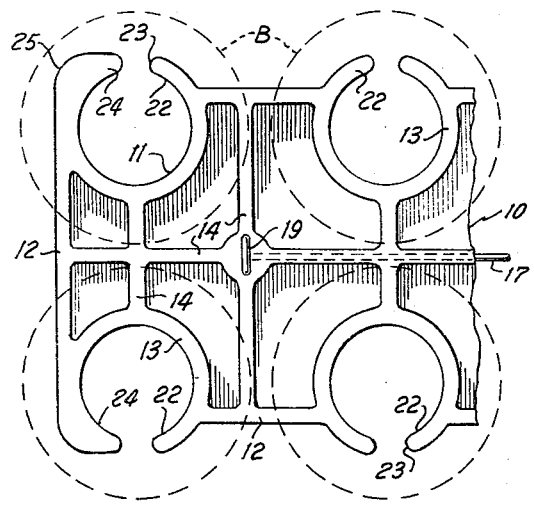
Figure 3:
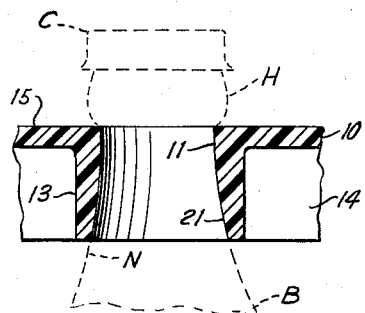
Figures 4, 5:
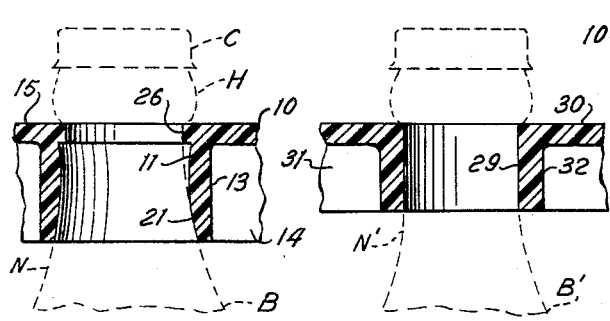
Figure 6:
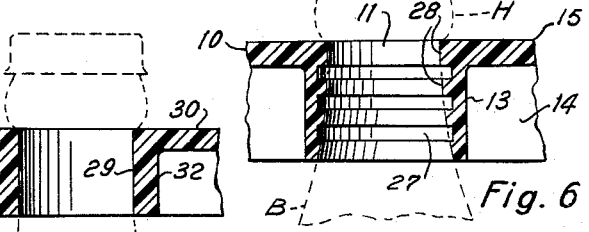
Figure 7:
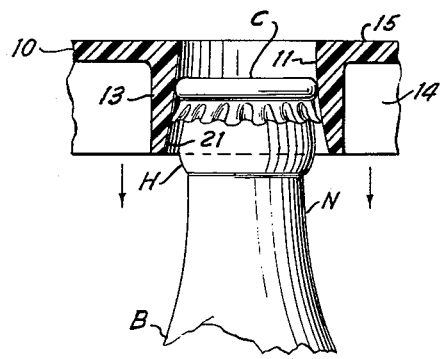
Figure 8:
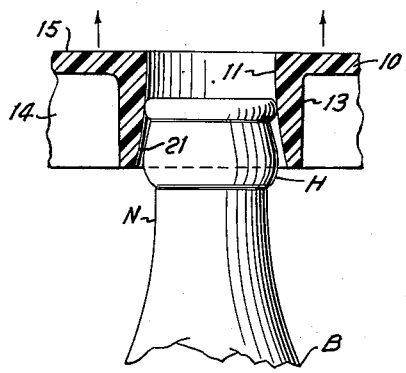
Figure 9:
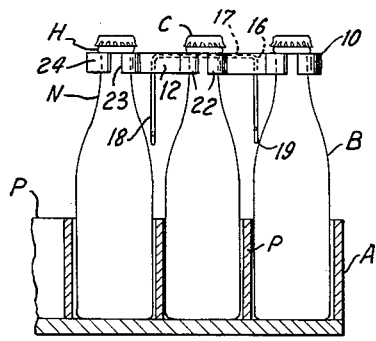
Figure 10:
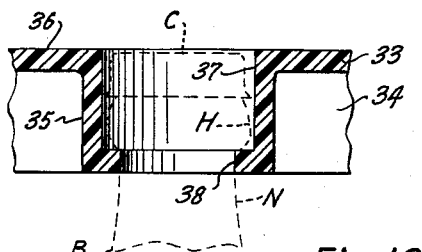
Figure 12:
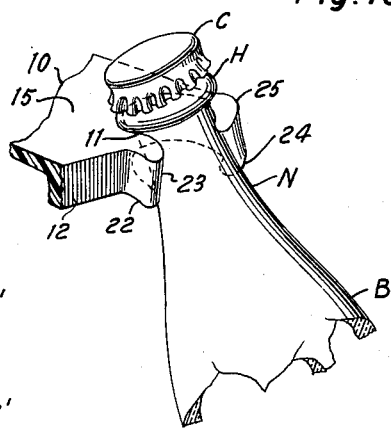
Figure 11:
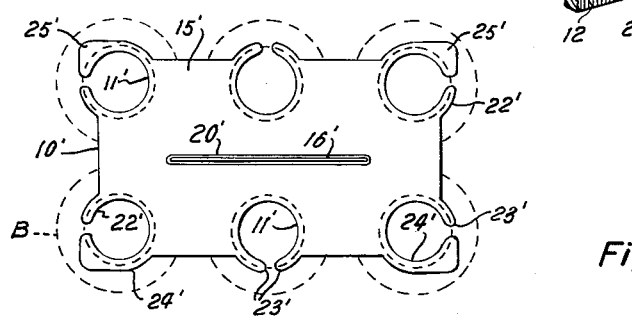

The invention will be more readily understood from a reading of the following specification and by reference to the accompanying drawings, wherein examples of the invention are shown, and wherein:

FIG. 1 is a perspective view of a bottle carrier constructed in accordance with the invention, FIG. 2 is a bottom plan view of a portion of the carrier, FIG. 3 is a transverse, vertical, sectional view of one of the sockets of the carrier, FIGS. 4, 5 and 6 are views, similar to FIG. 3, of modified sockets, FIGS. 7 and 8 are views, similar to FIG. 3, showing the insertion and removal of a bottle, respectively, by relative longitudinal movement thereof, FIG. 9 is a side elevational view of the carrier loaded with its bottles engaged in a conventional case, FIG. 10 is a view, similar to FIG. 3, of a modified socket for supporting a bottle by its head, FIG. 11 is a top plan view of a modified carrier, and FIG. 12 is a perspective view illustrating the removal of a bottle by swinging movement thereof.

In the drawings, the numeral 10 desigantes the substantially flat or plate-like, rectangular body of a bottle carrier embodying the principles of the invention and formed of polyethylene, other suitable plastic, rubber or other elastic or resilient material having sufficient rigidity and durability for the purpose. As will be explained, the body has circular openings or sockets 11 in or at its marginal edge portions for supporting bottles B by their neck or head portions N and H, respectively. In order to provide sufficient strength and employ minimum material, the body 10 is of ribbed construction which may include reinforcing ribs 12 at its perimeter or margins, substantially annular collars 13 surrounding the sockets 11 and cross or intermediate ribs 14 connecting the marginal ribs and/or collars, as most clearly shown in FIG. 2.

Preferably, the ribs and collars are formed on the underside of the body to provide a relatively-thin, substantially flat upper surface or top 15. It is noted that the reinforcing ribs 12 and 14 extend longitudinally and transversely of the body and that said ribs 12 form the edge portions or sides of said body. A handle 16, which may be of the usual bail or U-shaped type having a flat bight or hand grip portion 17 and legs 18 with enlarged end portions 19, extends slidably through the body at its longitudinal axis and the top 15 of said body may have a longitudinal groove 20 to permit recessing of the handle portion 17.

Each socket 11 is of a diameter substantially equal to the diameter of the neck portion N or the bottle B to be engaged with and supported by the socket and, as shown by the numeral 21, said socket or its lower portion may be bevelled or tapered in conformity with the contour of said neck portion (FIG. 3). The collars 13, which surround or the bores of which form the sockets, project beyond the margins and ribs 12 of the body and have their outer portions interrupted or cut away to provide a pair of spaced, coacting, flexible elements or jaws 22 with an opening 23 therebetween, whereby said collars and their jaws provide means for gripping and retaining the upper end or neck portions of the bottles in said sockets. As shown in FIGS. 1 and 2, all of the jaws may project from the opposed longitudinal margins of the body with their openings 23 directed laterally; however, as shown by the numeral 23′ in FIG. 11, the jaw openings of the corner sockets 11′ may be directed longitudinally or toward the ends of said body. It is noted that the same numerals have been primed to designate the similar elements of the modified carrier of FIG. 11.

In order to strengthen the outer jaws 24 and 24′ of the corner sockets, the same may be of increased radial thickness, particularly, adjacent their outer ends to provide enlargements or protuberances 25 and 25′. As shown, the latter may be formed by extending the outer surface of each outer corner jaw in a straight line in parallel relation to the adjacent margin of the body and then directing said surface at substantially a right angle toward the coacting inner jaw. In FIGS. 1 and 2, the portions of the collars which form the outer corner jaws 24 merge with the marginal end rib 12 of the body.

The bottles B are adapted to be suspended from the body of the carrier by engagement of their neck portions N with the sockets 11, whereby the bulbous heads H of said bottles project above said sockets and rest upon the flat top 15 of said body. Due to the flexibility of the carrier body, and particularly its collars 13, the bottles may be inserted and removed by relative longitudinal movement between said body and bottles as shown by the arrows in FIGS. 7 and 8. It is contemplated that this relative movement may be accomplished by machine whereby the carrier may be loaded and unloaded automatically. The bevelled or tapered, enlarged or relieved, lower portions 21 of the sockets facilitate longitudinal insertion of the bottle heads H and their caps C and increase the flexibility of the lower or lip portions of the collars by reducing the thickness thereof to permit outward distortion of said collar portions upon such insertion.

As shown in FIG. 12, the flexibility of the jaws 22 and 24 permits insertion and removal of the bottles by pivotal or swinging movement of each bottle relative to one of the sockets and the jaws thereof. To insert a bottle, the same is held or positioned at an outward and downward angle relative to the carrier body with its neck portion N engaging the upper edge portions of the jaws. Upon forcing and swinging the bottle inwardly toward the socket, the jaws are spread or flex outwardly to accommodate the neck portion of said bottle and its engagement with the socket. The bottle is removed by relative outward pivotal or swinging movement and pulling of said bottle. It is pointed out that the collars 13 are of appreciable depth or length which is sufficient to positively grip the upper end or neck portions of the bottles to stabilize said bottles against displacement or relative movement.

In order to reinforce the collars, and particularly the jaws thereof, an internal, annular shoulder or radial flange 26 may be provided at the upper end of each socket 11 in alinement with and as a flush continuation of the flat top 15 of the body (FIG. 4). The frictional engagement of the sockets may be concentrated and the flexibility of the collars may be increased by the provision of alternate, internal annular, radial grooves 27 and flanges or ribs 28 in each socket (FIG. 6). As set forth hereinbefore, the sockets preferably conform to the contour of the neck portions of the bottles. Some bottles B' have relatively straight neck portions N' whereby the sockets and collars may have substantially straight bores 29 (FIG. 5). If desired, the thickness of the body and the depth of its ribs and collars may be reduced as shown by the numerals 30, 31 and 32.

It is noted that the spacing between the sockets is such that the bottles are suspended by the carrier for engagement in the cells of a conventional case A formed by the usual cross partitions P (FIG. 9). Also, the slidable mounting and recessing of the handle 16 permits the flat stacking of loaded carriers upon one another. Although carriers capable of supporting six bottles have been illustrated, it is apparent that the quantity is immaterial and may be four, eight, ten, twelve, etc.

In FIG. 10, a modified carrier body 33 is shown and includes similar reinforcing ribs 34 and collars 35 underlying its flat top 36. Each collar 35 has a cylindrical bore or socket 37 with an internal, radial flange or annular shoulder 38, similar to the shoulder 26, at its lower end. Although not illustrated, the shoulder continues throughout the jaws of the collar. The head H of a bottle is adapted to engage within each socket 37 and rest upon its shoulder 38 with the cap C of the bottle substantially flush with or below the flat top 36 of the bottle carrier 33, whereby the neck portion N of said body is gripped by said shoulder. Of course, the socket may be of such diameter as to frictionally engage the bottle head so as to stabilize the bottle.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A unitary structure bottle carrier including a substantially flat flexible body having openings in its margins for receiving a plurality of bottles, and elastic means having a width substantially like that of said body substantially surrounding the openings for retaining the bottles therein and permitting insertion and removal of the bottles by relative longitudinal movement between the bottles and body, the elastic means having interrupted outer portions to provide spaced flexible elements for gripping the bottles and permitting insertion and removal thereof by swinging movement of the bottles relative to the body.

2. A unitary structure bottle carrier including a flexible plate like body having openings in its margins for receiving the upper end portions of a plurality of bottles, and elastic means having a width substantially like that of said body substantially encircling the openings for retaining the bottles therein and permitting insertion and removal of the bottles by relative longitudinal movement between the bottles and body, the elastic means being discontinuous to provide spaced flexible elements at the outer portion of each elastic means for gripping the upper portions of the bottles and permitting insertion and removal thereof by pivotal movement of the bottles relative to the body.

3. A unitary structure bottle carrier including a substantially resilient flat body having openings in its margins for receiving a plurality of bottles, and substantially annular collars being of substantially the thickness of the body member and formed of elastic material carried by the body in surrounding relation to the openings for retaining the bottles therein and permitting insertion and removal of the bottles by relative longitudinal movement between the bottles and body, each collar having spaced end portions directed outwardly of said body for permitting insertion and removal of a bottle therebetween by swinging movement of the bottle relative to said body.

4. A unitary structure bottle carrier as set forth in claim 3 wherein the openings are formed in opposed margins of the body and the collars have bores substantially conforming to the contour of the upper end portions of the bottles.

5. A unitary structure bottle carrier as set forth in claim 3 wherein the spaced end portions of the collars form coacting flexible jaws for gripping the bottles.

6. A unitary structure bottle carrier including a substantially resilient flat rectangular body, socket means at the margins of the body and of substantially the depth of the body for receiving the upper end portions of a plurality of bottles, the socket means being formed of elastic material for gripping the upper end portions of the bottles and of a spacing between the outwardly extending ends sufficient for permitting insertion and removal thereof by relative longitudinal movement between the bottles and body, each socket means having an outwardly-directed opening to permit insertion and removal of the bottles by pivotal movement relative to said body.

7. A unitary structure bottle carrier as set forth in claim 6 wherein each socket means includes spaced flexible elements capable of distortion upon insertion and removal of a bottle through the outwardly-directed opening therebetween.

8. A unitary structure bottle carrier as set forth in claim 6 wherein each socket means includes a substantially annular encircling collar.

9. A unitary structure bottle carrier as set forth in claim 6 wherein each socket means includes a pair of spaced coacting jaws disposed outwardly of the body with the opening therebetween and adapted to flex upon insertion and removal of a bottle by pivotal movement of the bottle relative to the body.

10. A unitary structure bottle carrier as set forth in claim 6 wherein each socket means includes a substantially annular encircling collar having spaced end portions disposed outwardly of the body with the opening therebetween and capable of being distorted and spread upon insertion and removal of a bottle by pivotal movement of the bottle relative to the body.

11. A unitary structure bottle carrier including a flat substantially rectangular body of resilient material having circular openings in its margins for receiving the upper end portions of bottles in spaced relation, and a substantially annular collar of elastic material surrounding each opening and having spaced end portions projecting outwardly from the margins of the body and forming coacting jaws, the collar and jaws being of substantially the same thickness as the body, the jaws of each collar gripping the upper end portion of a bottle and flexing to permit insertion and removal of the bottle therebetween by swinging movement of the bottle relative to said body, said jaws spreading to permit insertion and removal of the bottles by relative longitudinal movement between the bottles and body.

12. A unitary structure bottle carrier as set forth in claim 11 wherein the body has a substantially flat top and the collars depend from the underside of said body.

13. A unitary structure bottle carrier as set forth in claim 12 wherein the body has reinforcing ribs on its underside at its margins and connecting the collars and margins.

14. A unitary structure bottle carrier as set forth in claim 11 wherein the collars have bores forming the openings of the body and conforming to the contour of the neck portions of the bottles.

15. A unitary structure bottle carrier as set forth in claim 11 wherein the collars have bores forming the openings of the body and conforming to the contour of the heads of the bottles, and means at the lower portion of each collar for supporting a bottle by its head with its cap substantially flush with the upper surface of said body.

16. A unitary structure bottle carrier as set forth in claim 11 wherein the collars have bores forming the openings of the body, the lower portions of the bores being enlarged to facilitate the insertion of bottles therein by longitudinal movement of the bottles toward said body.

17. A bottle carrier embodying a hollow frusto-conical part with a diameter at the smaller upper end less than that of the enlarged neck portion of a bottle intended to be carried, said part having opposed sides resiliently connected and adapted to be flexed apart for the reception of the bottle neck by forcibly spreading the sides by relative axial insertion of the enlarged neck portion of the bottle and automatically to contract into position below said enlarged portion, said frusto-conical part having an open top and adapted to expose fully the top part of the inserted bottle.

18. A bottle carrier embodying a frame including a carrying handle, a plurality of bottle supporting elements each comprising a hollow open top frusto-conical part with a diameter at the smaller upper end less than that of the enlarged neck portion of a bottle intended to be carried, said part having opposed sides resiliently connected and adapted to be flexed apart for the reception of the bottle neck and automatically to contract into position below said enlarged portion with the upper end of the bottle completely exposed.

19. A bottle carrier embodying a hollow open top split frusto-conical part having an outer open slot and arc-shaped sides the diameter at the smaller upper end between the opposed arc-shaped sides being normally less than that of the upper enlarged neck portion of a bottle intended to be carried, said sides being capable of being resiliently flexed apart by the axial reception of the bottle through the larger open bottom end of said conical part and to contract automatically into bottle supporting position below the enlarged neck portion with the upper end of the bottle completely exposed.

20. A bottle carrier embodying a plurality of hollow open top split frusto-conical elements each adapted to receive a bottle and each having an outer open slot and opposed arc-shaped sides resiliently connected together and adapted to be flexed apart, the upper smaller diameter of the element being less than that of the enlarged neck portion of the bottle intended to be carried, frame means including a handle portion connecting said elements, the opposed sides of the elements being adapted to be flexed apart by forcible downward axial engagement over the neck of the bottle and to contract about the bottle neck below the enlarged portion, and the bottle being releasable laterally through the slot by swinging the bottle angularly from the bottom thereby to wedge apart the opposed sides of the element.

21. A bottle carrier embodying a frame, a plurality of bottle supporting elements mounted in spaced relation at the outer part of said frame, each element comprising a hollow open top split frusto-conical part having an outer open slot and opposed arc-shaped sides, the diameter at the smaller upper end between the opposed sides being normally less than that of the upper enlarged neck portion of a bottle intended to be carried, at least one of said sides being composed of resilient material and adapted to flex open to receive the bottle neck axially through the larger open bottom end of the conical part and to contract automatically into bottle supporting position about the bottle neck below the enlarged neck portion.

22. A bottle carrier embodying a supporting frame part and a bottle supporting part connected thereto comprising a hollow frusto-conical element with opposed arc-shaped members providing a slot at a point in the periphery between opposed ends of the arc-shaped members, said members being secured together and to the frame part along a side edge of the cone peripherally spaced from said slot, said members being flexibly held normally in closed bottle neck engaging position and adapted to be spread into open position by the relative axial movement into the larger open end of the cone of the upper enlarged neck portion of the bottle and then to close automatically below said neck portion for supporting the bottle.

23. A bottle carrier embodying a supporting handle part, and a bottle supporting part extending laterally from said handle part, comprising a hollow open top frusto-conical element with opposed arc-shaped members secured together and to the handle portion along a side edge of the cone, said members providing a vertically extending slot between opposed ends of the members peripherally opposite to said side edge connection to the handle, said members being flexibly held normally in closed bottle neck engaging position and adapted to be spread into open position for release of the bottle by swinging of the bottom portion away from said handle and substantially in the general plane of said handle.

References Cited in the file of this patent

UNITED STATES PATENTS

| | | |
|---|---|---|
| 2,161,855 | Copell | June 13, 1939 |
| 2,301,594 | Voigtritter | Nov. 10, 1942 |
| 2,420,191 | Ransom | May 6, 1947 |
| 2,446,670 | Shikles et al. | Aug. 10, 1948 |
| 2,518,823 | Schneider | Aug. 15, 1950 |
| 2,637,475 | Gialanella | May 5, 1953 |
| 2,731,665 | Zebarth | Jan. 24, 1956 |